No. 733,627. PATENTED JULY 14, 1903.
F. P. COX.
POLARITY INDICATOR.
APPLICATION FILED JAN. 21, 1901.
NO MODEL.
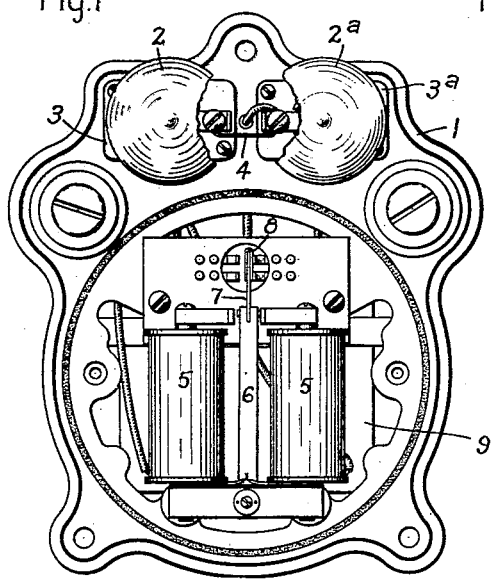
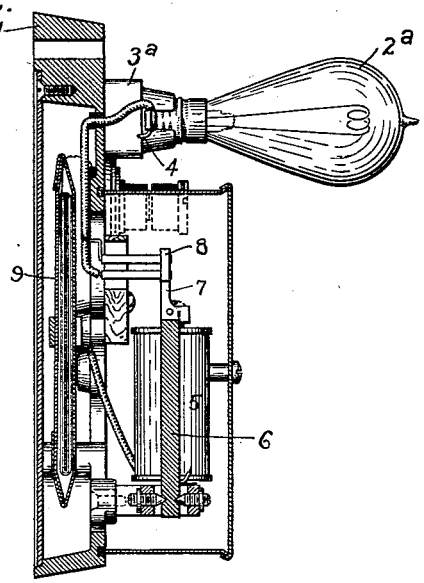
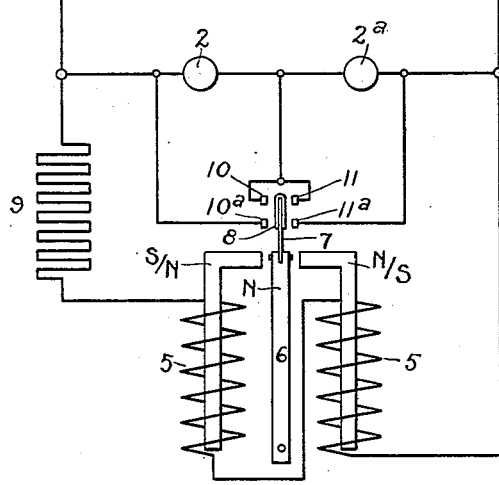
Witnesses.
John Ellis Glenn.
Benjamin R. Hull.
Inventor.
Frank P. Cox,
by Albert G. Davis
Atty.

No. 733,627.

Patented July 14, 1903.

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

POLARITY-INDICATOR.

SPECIFICATION forming part of Letters Patent No. 733,627, dated July 14, 1903.

Application filed January 21, 1901. Serial No. 44,052. (No model.)

*To all whom it may concern:*

Be it known that I, FRANK P. COX, a citizen of the United States, residing at Lynn, county of Essex, State of Massachusetts, have invented certain new and useful Improvements in Polarity-Indicators, of which the following is a specification.

This invention relates to a device for indicating the polarity of current in distribution-circuits. It frequently happens that a source of current-distribution becomes reversed in direction, and when translating devices of such character as are injuriously affected by such change in direction are connected in the system considerable damage may be done before the reversal is discovered. For example, if storage batteries or arc-lamps be connected in a circuit and the current be reversed the batteries would be discharged and a crater would be formed in the negative carbon of the lamps. Reversals of this kind are particularly liable to occur in certain classes of apparatus—such as, for example, rotary converters—in which direct current is supplied from one pair of terminals and the machine driven by an alternating current supplied to another pair of terminals. In such machines it frequently happens that by reason of overloads or other changes of condition on the alternating side the alternating motor falls out of step or loses a half-step without actually falling out of synchronism, thus reversing the current on the direct-current side, or in starting up such a machine the polarity of the current on the direct-current side is purely accidental. The function of the device contemplated in this application is to indicate the direction of current in a circuit, so as to permit necessary changes—as, for example, a reversal of the field-magnet of the direct-current generator—to insure a proper polarity in the feeders or on the bus-bars of the distributing system.

In carrying out the invention I provide a polarized magnet in operative relation to an electromagnet connected across the circuit in which the indication is desired and connect also with such circuit two or more incandescent lamps, which act as signaling devices to indicate the direction of current in the circuit. When the electromagnet is polarized in one sense, one of these lamps will burn, and when polarized in the other sense the other will burn. I prefer to connect the two lamps in series across the circuit, arranging the magnetic control device so that contacts will be made to short-circuit either lamp accordingly as the current flows in one direction or the other.

The novel features will be more particularly hereinafter described and will be definitely indicated in the claims appended to this specification.

In the accompanying drawings, Figure 1 is a front elevation with the cover removed of an instrument embodying my improvements. Fig. 2 is a vertical section on a median plane. Fig. 3 is a diagram showing the relation of the parts of the instrument to a circuit.

The instrument comprises a cast-metal base 1, on which are mounted two incandescent lamps 2 2$^a$, one of which may be red and the other white or of other color to give a distinct visual indication of each. These lamps are supported in porcelain sockets 3 3$^a$, on which are mounted appropriate terminals. In series with the lamps is a fuse 4. An electromagnet 5 has pivotally supported in its yoke a bar-magnet 6, to which is affixed a tongue 7, tipped at the end with a silver contact 8, bent around the tongue and soldered or otherwise clamped in position. This tongue coöperates with pairs of contacts on either side when shifted to its limit of movement on that side and bridges said contacts, completing a short circuit for one or the other of the lamps. In series relation to the coils of the magnet is a resistance wound on an insulating-card and nested on suitable supports in a hollow space in the base of the instrument, as indicated at 9.

The circuit connections are indicated clearly in Fig. 3. In the position shown in the diagram no current is flowing in the system. It will be evident that when current flows the pole of the permanent magnet 6 will be drawn to one side or the other of the electromagnet, according to the direction of current in the system. If drawn to the left, the silver-tipped light spring-contacts 10 10$^a$ are bridged and the lamp 2 short-circuited, current flowing from the lower main contacts 10$^a$ 10 and thence through the lamp 2ᵃ to the opposite main. If, however, current should reverse, the magnetism of the electromagnet 5 will reverse, changing the poles with respect to the free pole N of the bar-magnet 6 and simultaneously shifting the latter to the right side, thereby opening the contact at points 10 10ᵃ and bringing the silver-tipped bridge 8 into engagement with contacts 11 11ᵃ, in which position the lamp 2ᵃ is short-circuited and current flows across contacts 11ᵃ 11 through lamp 2 to the lower main. The base of the instrument is provided with perforated ears or lugs, through which bolts or screws may be passed to support the instrument on a switchboard or other desired support, and a round cover is provided for the contacts and magnetic operating parts, so as to exclude dirt.

What I claim as new, and desire to secure by Letters Patent of the United States, is—

1. A polarity-indicator comprising a polar relay and two indicating-lamps mounted on a common base, in combination with double break-contacts bridged by the armature of the relay at its limits of vibration, and connections for cutting in one or the other lamp and common terminals for the lamps and relay.

2. A polarity-indicator comprising in a single instrument an electromagnet provided with terminals for connection with the two sides of a distribution-circuit, a permanent bar-magnet pivoted to play between the poles of said electromagnet, a contact carried thereby, coöperating contacts at either side adapted to be bridged by the movable contact, two incandescent lamps in series relation provided with terminals for connection with the distribution-circuit, and connections for short-circuiting one or the other of said lamps at the limits of movement of the movable contact.

In witness whereof I have hereunto set my hand this 17th day of January, 1901.

FRANK P. COX.

Witnesses:
　DUGALD McK. McKILLOP,
　JOHN J. WALKER.